United States Patent
Chen et al.

(10) Patent No.: US 6,591,324 B1
(45) Date of Patent: Jul. 8, 2003

(54) HOT SWAP PROCESSOR CARD AND BUS

(75) Inventors: Hsiang-Chan Chen, Taipei (TW); Hui-Guo Tung, Taipei Hsien (TW)

(73) Assignee: Nexcom International Co. Ltd., Chung-Ho (TW)

( * ) Notice: Subject to any disclaimer, the term of this patent is extended or adjusted under 35 U.S.C. 154(b) by 386 days.

(21) Appl. No.: 09/614,563

(22) Filed: Jul. 12, 2000

(51) Int. Cl.[7] ............................................... G06F 13/00
(52) U.S. Cl. ...................................... 710/302; 710/300
(58) Field of Search ................................ 710/300, 301, 710/302, 303, 304; 714/11, 13, 41

(56) References Cited

U.S. PATENT DOCUMENTS

| | | | |
|---|---|---|---|
| 5,922,077 A | * 7/1999 | Espy et al. | 714/7 |
| 5,953,314 A | * 9/1999 | Ganmukhi et al. | 370/220 |
| 5,986,880 A | * 11/1999 | Santeler et al. | 361/684 |
| 6,061,752 A | * 5/2000 | Jones et al. | 710/302 |
| 6,282,596 B1 | * 8/2001 | Bealkowski et al. | 710/302 |

* cited by examiner

Primary Examiner—Xuan M. Thai
Assistant Examiner—Tim Vo
(74) Attorney, Agent, or Firm—Winston Hsu

(57) ABSTRACT

A processor card has a connector for plugging into a processor slot, signal switching circuitry electrically connected to the connector, power switching circuitry for controlling power to the processor card and a processor electrically connected to the signal switching circuitry. The power switching circuitry allows power to be selectively delivered to the processor card, and the signal switching circuitry enables the processor card to be hot swapped in and out of a PCI hot swap bus. The processor card works in conjunction with a similar processor card on the bus to perform the hot swap procedure.

14 Claims, 2 Drawing Sheets

HOT SWAP PROCESSOR CARD AND BUS

BACKGROUND OF THE INVENTION

1. Field of the Invention

The present invention relates to a processor card. More specifically, the present invention discloses a processor card that can be hot swapped in and out of a PCI hot swap bus.

2. Description of the Prior Art

In many fields, such as in telecommunications and network servers, computing equipment downtime is simply unacceptable. Nevertheless, failures occur and to ensure that the downtime is kept to an absolute minimum, certain design techniques have been adopted. For example, motherboard design concepts have been abandoned for a passive backplane architecture. A passive backplane is simply a circuit board with an absolute minimum amount of circuitry, with slots into which other circuit boards are plugged. Since a passive backplane has, ideally, no circuitry on it, its mean time between failures (MTBF) is considerably longer than a motherboard. An appropriately designed processor card plugs into its processor slot on the backplane. Similarly, add-on cards plug into their add-on-card slots on the backplane. In this manner, via traces on the backplane, the processor and its associated bus circuitry are connected to the add-on cards.

When either an add-on card or a processor card fails, the card is simply unplugged from the passive backplane and a replacement is inserted. The entire process is relatively quick and easy, which would not be the case if a motherboard architecture had been adopted and it was the motherboard itself that had failed. The catastrophic equivalent of this using a passive backplane architecture is the backplane itself failing. This, however, is highly unlikely as the passive backplane has no active onboard circuitry.

Although the above swapping technique is quite quick, it used to be necessary that any card, processor or add-on, be cold swapped. That is, the computing equipment had to be powered down, and then the card could be removed and replaced. Unfortunately, powering down such equipment, and powering it back up, forced the entire device to go offline when, perhaps, only a relatively minor card needed to be replaced. Furthermore, powering up the computing equipment often entails a relatively lengthy booting procedure before the equipment comes back online. Consequently, hot swapping techniques were developed. Such techniques enable an add-on card to be swapped from the bus without powering down the computing device. The other elements, the processor card and properly functioning add-on cards, could continue to operate and thus continue to provide a service, albeit with a reduced functionality. With the defective card replaced and brought back online, full functionality would return to the computing device.

The current standard for hot swapping add-on cards from a PCI bus is defined by the so-called Compact PCI Hot Swap Specification. This standard was developed by a consortium, the PCI Industrial Computers Manufacturing Group (PICMG), and was made public in a release, PICMG 2.1 R1.0.

Please refer to FIG. 1. FIG. 1 is a function block diagram of a PCI hot swap bus 10, which is used as a server that controls a RAID hard disk array. The PCI hot swap bus 10 comprises a processor slot 11 into which is plugged a processor card 20, and a plurality of add-on-card slots 12 into which are plugged various add-on cards. Some of the add-on cards may be I/O cards 14 that establish communications with external devices, such as modems. Other add-on cards may be network cards 16 to establish communications across a network, or SCSI cards 18 to communicate with SCSI devices. Other types of cards may, of course, be plugged into the bus 10. Each card is connected to a corresponding slot via a connector 13. Excepting the processor card 20, every card on the PCI hot swap bus 10 comprises power switching circuitry 15, signal switching circuitry 17, and PCI circuitry 19 dedicated to fulfilling the specific functionality of the card. The power switching circuitry 15 is used to individually control power to each card. The power switching circuitry 15 may be manually controlled, or may be controlled by another device on the bus 10, such as the processor card 20. The signal switching circuitry 17 is used to electrically connect and disconnect the card from signal lines of the bus 10. The signal switching circuitry 17 is of critical importance when hot swapping a card, as it prevents transients from disrupting other cards on the bus 10, and performs appropriate hardware interfacing protocol functions when an add-on card is being inserted into, or pulled from, an add-on-card slot 12.

The processor card 20, however, is special in the prior art PCI hot swap bus 10. It has neither power switching circuitry nor signal switching circuitry. Instead, it has a processor 25 and PCI circuitry 27. The PCI circuitry 27 interfaces the processor 25 with the PCI hot swap bus 10, and also improves the fan-out capabilities of the processor card 20, allowing it to interface with more-add-on cards on the bus 10. In this example, the processor card 20 is used to control a RAID control circuit 40 for an array of hard disk drives 42. The RAID control circuit 40 controls the hard disk drives 42 to fetch and store information.

Finally, a power control circuit 30 supplies power to the PCI hot swap bus 10, and it is from this power control circuit 30 that each of the cards in their respective slots 11, 12 obtains electrical power.

Although all the add-on cards 14, 16 and 18 may be hot swapped from their add-on-card slots 12, the processor card 20 is, again, an exception. Because the processor card 20 lacks both the signal switching circuitry and the power switching circuitry of the other cards, it cannot be hot swapped from the processor slot 11. It lacks the necessary hardware to conform to the PCI hot swap specifications. Moreover, hot swapping a processor card 20 is generally considered impossible because the processor card 20 usually controls many of the signal lines 10 on the bus that the other cards require to function properly.

Nevertheless, being unable to hot swap the processor card 20 of the prior art is a severe drawback that leads to expensive downtimes in systems where any downtime at all is considered intolerable.

SUMMARY OF THE INVENTION

It is therefore a primary objective of this invention to provide a processor card that can be hot swapped from a PCI hot swap bus so as to prevent downtime in critical systems.

The present invention, briefly summarized, discloses a processor card that plugs into a processor slot on a PCI hot swap bus. The processor card has a connector for plugging into the processor slot, signal switching circuitry electrically connected to the connector, power switching circuitry for controlling power to the processor card and a processor electrically-connected to the signal switching circuitry. The power switching circuitry allows power to be selectively delivered to the processor card, and the signal switching circuitry enables the processor card to be hot swapped in and out of the PCI hot swap bus.

It is an advantage of the present invention that a malfunctioning processor card can be swapped out of the bus without needing to power down other components on the bus. Consequently, downtimes are reduced, and, with a preferred embodiment of the present invention, no downtime at all need be suffered.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
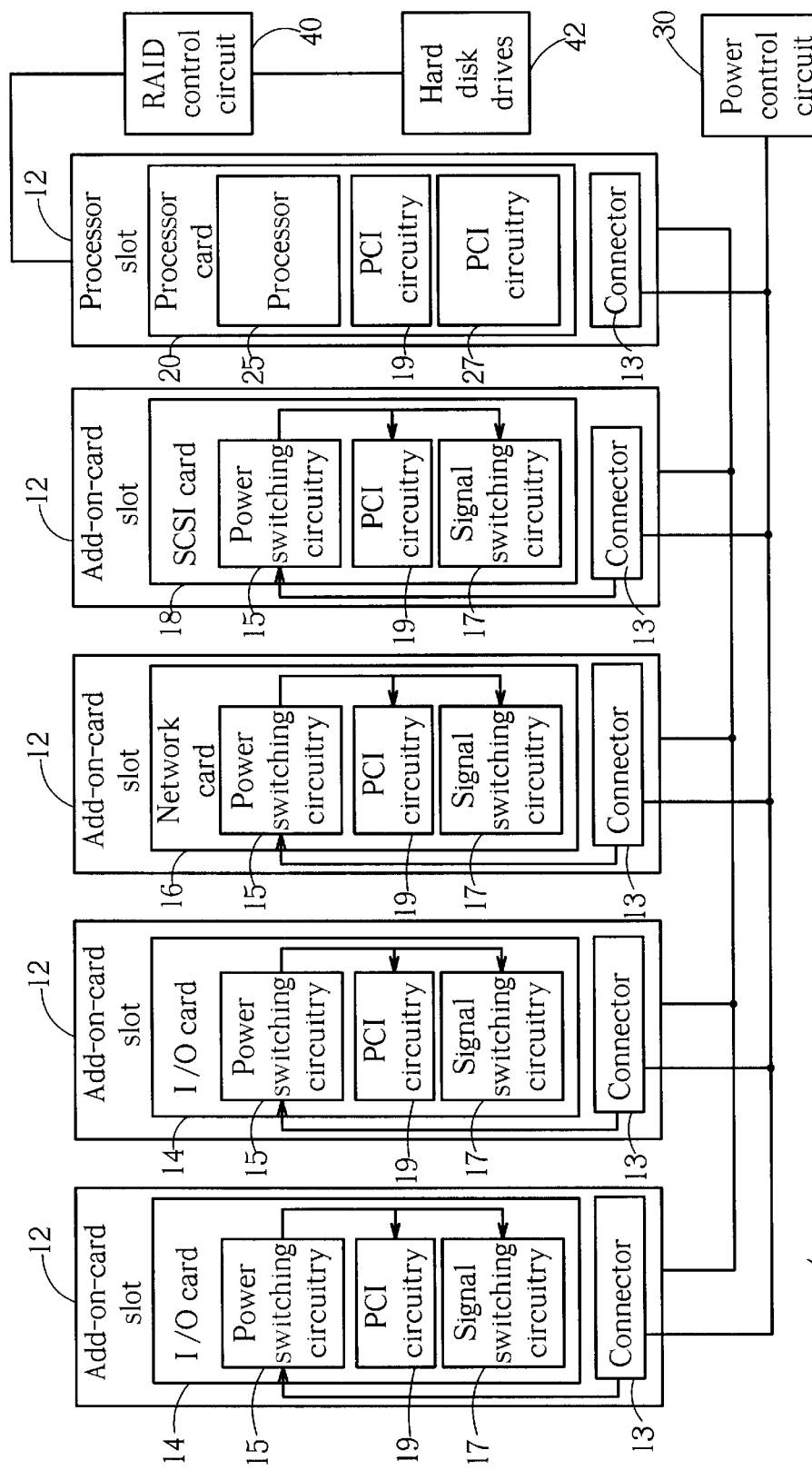
FIG. 1 is a function block diagram of a prior art PCI hot swap bus.
Figure 2:
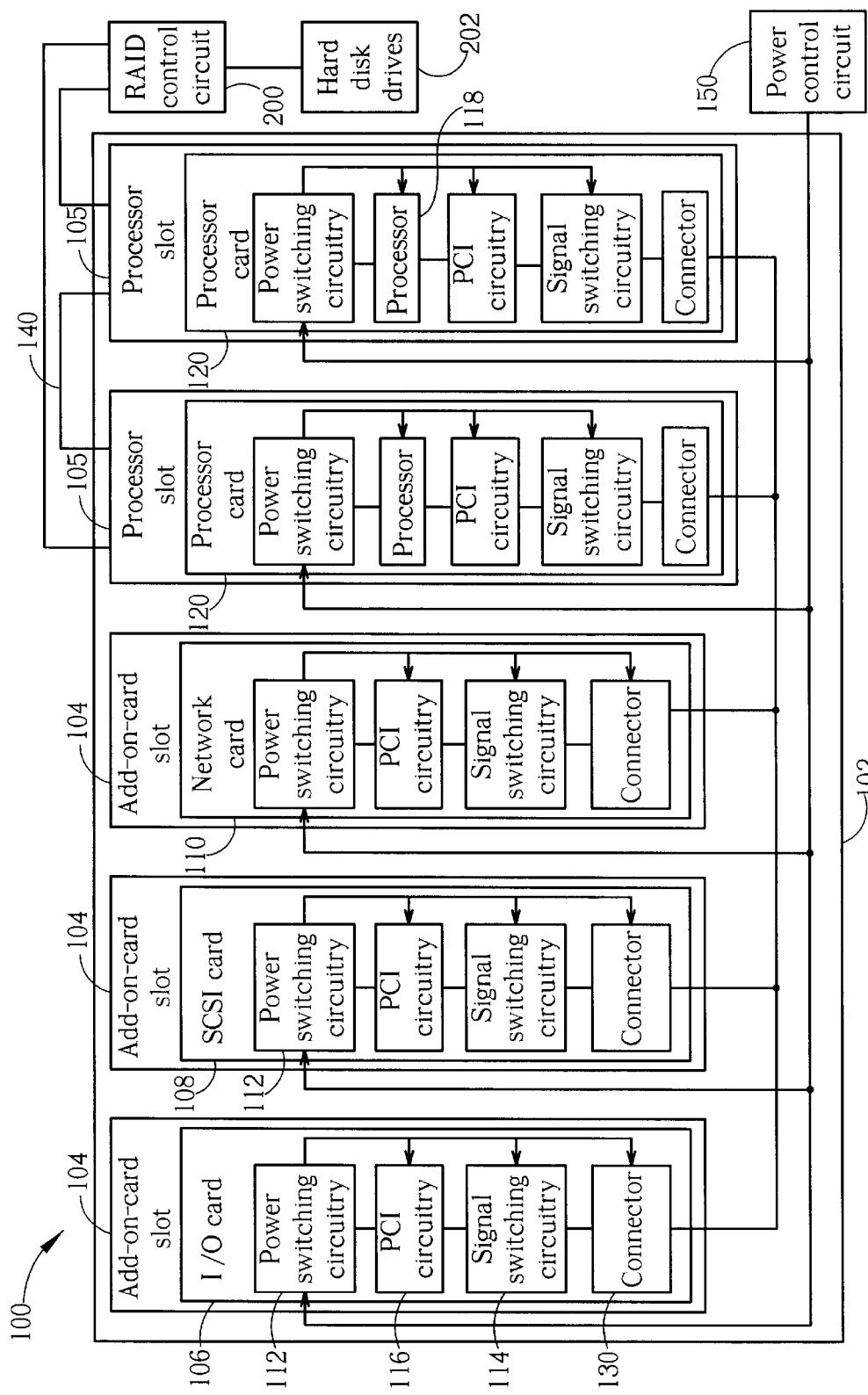
FIG. 2 is a function block diagram of a PCI hot swap bus according to the present invention.

Please refer to FIG. 2. FIG. 2 is a function block diagram of a PCI hot swap bus 100 according to the present invention. The PCI hot swap bus 100 conforms to specifications outlined in PICMG 2.1 R1.0. This document can be obtained from the PCI Special Interest Group, or from PICMG. The PCI hot swap bus 100 is setup on a backplane 102. The backplane 102 has a plurality of add-on-card slots 104 and two processor slots 105 that are electrically connected together via the PCI hot swap bus 100. Various types of hot swappable add-on cards plug into the add-on-card slots 104, such as I/O cards 106 to communicate with external devices (like modems), SCSI cards 108 to communicate with SCSI devices (like hard disks), or network cards 110 to establish network communications with other devices. Also, two processor cards 120 plug into the processor slots 105. Each of the add-on cards 106, 108, 110 and processor cards 120 plugs into its slot 104, 105 using a connector 130 that is installed on the card so that PCI signal lines on the PCI hot swap bus 100 connect to their appropriate signal lines on the card.

Every add-on card on the backplane 102 has power switching circuitry 112, signal switching circuitry 114, and PCI circuitry 116 to fulfill the functionality requirements of the card. The signal switching circuitry 114 electrically connects to the connector 130. Each processor card 120 has power switching circuitry 122, signal switching circuitry 128, and PCI circuitry 126. The signal switching circuitry 128 electrically connects to the connector 130. In addition to this, each processor card 120 has a processor 118. The PCI circuitry 126 on the processor card 120 has functionality that is additional to that of the other cards 106, 108, 110.

A power control circuit 150 plugs into the backplane 102 to supply power to the slots 104, 105, and thus to the cards within the slots 104, 105. The power switching circuitry 112, 122 on each card permits power to be selectively delivered to the card. This power switching circuitry 112, 122 can be both manually controlled to turn a card on or off, and it may also be remotely controlled by other cards on the PCI hot swap bus 100 to turn the card off. Specifically, the processor cards 120 can control the power switching circuitry 112, 122 of the other cards to turn the cards off. The power switching circuitry 112, 122 on each card receives power through its corresponding connector 130 and delivers power to all of the other components on the card, such as to the signal switching circuitry 114, 128, the PCI circuitry 116, 126, and to the processor 118 if the card is a processor card 120.

The signal switching circuitry 114, 128 on each card conforms the card to the PCI hot swap specifications. The signal switching circuitry 114, 128 ensures that the card may be plugged into, and removed from, its slot 104, 105 without disrupting the operations of other devices on the PCI hot swap bus 100. Additionally, the signal switching circuitry 114, 128 performs the PCI hot swap bus protocols that informs other devices on the PCI hot swap bus 100 that the card is being removed from, or added to, the PCI hot swap bus 100. The PCI circuitry 126 on each processor card 120 functions to interface the processor 118 with the PCI bus 100.

To serve as an example of use for the present invention, each processor card 120 is connected to a RAID control circuit 200 to control the RAID control circuit 200. The RAID control circuit 200, in turn, controls an array of hard disk drives 202. By sending commands to the RAID control circuit 200, the processor cards 120 can read and write information to the hard disk drives 202. Hence, the processor cards 120 are plugged into the backplane 102 of a server.

In addition, each processor card 120 is connected to the other processor card 120 via a communications line 140. The communications line 140 is independent of the PCI hot swap bus 100, and thus the processor cards 120 do not need to use the PCI hot swap bus 100 to communicate with each other. This communications line 140 may be of any sort, preferably using a standard port. Examples include using a local area networking (LAN) connection, a serial connection (such as RS-232), a universal serial bus (USB) connection, or a fiber channel connection. The processors 118 are in continuous communication with each other through the communication line 140. The communications line 140 may be implemented in either a processor slot 105 to processor slot 105 manner, or in a processor card 120 to processor card 120 manner via a cable (not shown).

When power is delivered to the backplane 102 and all of the cards in their slots 104, 105 come online, in the present invention PCI hot swap bus 100 only one of the processor cards 120 actually connects to the bus 100 via its signal switching circuitry 128. The second processor card 120 sets its signal switching circuitry 128 so that it is electrically disconnected from the PCI hot swap bus 100. Consequently, the first processor card 120 becomes the main processor, controlling the RAID control circuit 200 of the server. The second processor card 120 stands idle. The first processor card 120 remains, however, in communication with the second processor card 120 via the communications line 140, and periodically informs the second processor card 120 of its health, that is, of the perceived health of the first processor card 120. Furthermore, the health of the first processor card 120 may be actively monitored by the second processor card 120.

In the event that the first processor card 120 detects a malfunction in its operations, it immediately informs the second processor card 120. The second processor card 120 then instructs its signal switching circuitry 128 to connect.to the bus 100, while simultaneously the first processor card 120 instructs its signal switching circuitry 128 to disconnect from the bus 100. Thus, the second processor card 120 takes over operations from the first processor card 120. An operator can then come to swap out the defective first processor card 120 with a new processor card 120. In the meantime, operations continue on the server without interruption or even any loss of data by way of the second processor card 120, as the second processor card can also control the RAID control circuit 200.

Alternatively, the second processor card 120 may control the signal switching circuit 128 of the first processor card 120 to disconnect the first processor card 120 from the bus 100 if the second processor card 120 determines that the first processor card 120 has malfunctioned. As above, at the same time the second processor card 120 causes its signal switching circuitry 128 to connect to the bus 100 so that the second processor card 120 can take over operations of the server. The second processor card 120 may even cause the power switching circuitry 122 of the first processor card 120 to simply turn the first processor card 120 off completely. Such an event may occur under instructions to the second processor card 120 from an operator when the first processor card 120 has suffered a catastrophic failure that so cripples it that it is unable to communicate with the second processor card 120. Indeed, any prolonged period of silence on the communications line 140 from the first processor card 120 to the second processor card 120 may be construed by the second processor card 120 as just such a failure. Of course, the first processor card 120 can also monitor and control the second processor card 120 in exactly the same manner.

By using two processor cards 120 with signal switching circuitry 128 and power switching circuitry 122, and by maintaining communications between the processor cards 120, the present invention PCI hot swap bus 100 can successfully hot swap either one of the processor cards 120. This provides component redundancy that successfully avoids any downtime of the computing device, thus saving money and preventing costly losses of data for systems where downtime cannot be tolerated.

In contrast to the prior art, the present invention processor card uses signal switching circuitry and power switching circuitry to conform to PCI hot swap specifications. By using a dedicated communications line to communicate with a similar processor card on the bus, either one of the processor cards may take control of the bus while the other disconnects from the bus. The disconnected processor card can then be swapped out of the bus and replaced with a new processor card.

Those skilled in the art will readily observe that numerous modifications and alterations of the device may be made while retaining the teachings of the invention. Accordingly, the above disclosure should be construed as limited only by the metes and bounds of the appended claims.

What is claims is:

1. A hot swappable processor card for a hot swap bus, the hot swappable processor card plugging into a processor slot of the hot swap bus, the hot swappable processor card comprising:
   a connector for plugging into the processor slot, the hot swappable processor card being hot swapped into the hot swap bus by plugging the connector into the processor slot, and hot swapped out of the hot swap bus by unplugging the connector from the processor slot;
   signal switching circuitry for connecting signal lines on the hot swappable processor card to signal lines of the hot swap bus, the signal switching circuitry electrically connected to the connector and enabling the hot swappable processor card to be hot swapped;
   a processor electrically connected to the signal switching circuitry;
   power switching circuitry for controlling power to the processor card; and
   a communications line for communicating with a second processor card that is plugged into the hot swap bus;
   wherein the second processor card can control the signal switching circuitry to electrically disconnect the hot swappable processor card from the bus.

2. The hot swappable processor card of claim 1 wherein the hot swappable processor card uses a PCI bus architecture.

3. The hot swappable processor card of claim 1 wherein the hot swappable processor card plugs into a backplane of an electrical device.

4. The hot swappable processor card of claim 1 wherein the communications line is a local area network (LAN) cable, a serial cable, a universal serial bus (USB) cable, or a fiber channel cable.

5. The hot swappable processor card of claim 1 wherein the hot swappable processor card is hot swapped from the bus after the signal switching circuitry has electrically disconnected the hot swappable processor card from the bus.

6. The hot swappable processor card of claim 1 wherein the second processor card can control the power switching circuitry to turn off or turn on the hot swappable processor card.

7. The hot swappable processor card of claim 2 further comprising PCI circuitry, the PCI circuitry enabling the hot swappable processor card to interface with a greater number of devices on the PCI bus.

8. A hot swap bus comprising:
   a first processor card and a second processor card, the first processor card plugging into a first processor slot on the hot swap bus, the second processor card plugging into a second processors slot on the hot swap bus, the first processor card and the second processor card each comprising:
   a connector for plugging into the first processor slot or the second processor slot, the processor card being hot swapped into the hot swap bus by plugging the connector into the processor slot, and being hot swapped out of the hot swap bus by unplugging the connector from the processor slot;
   signal switching circuitry for connecting signal lines on the processor card to signal lines of the hot swap bus, the signal switching circuitry electrically connected to the connector and enabling the processor card to be hot swapped;
   a processor electrically connected to the signal switching circuitry; and
   power switching circuitry for controlling power to the processor card; and
   a communications line that permits the first processor card and the second processor card to communicate with each other;
   wherein the second processor card can control the signal switching circuitry of the first processor card to electrically disconnect the first processor card from the bus.

9. The hot swap bus of claim 8 wherein the bus uses a PCI architecture.

10. The hot swap bus of claim 8 wherein each processor card plugs into a backplane of an electrical device.

11. The hot swap bus of claim 8 wherein the communications line is a local area network (LAN) cable, a serial cable, a universal serial bus (USB) cable, or a fiber channel cable.

12. The hot swap bus of claim 8 wherein the first processor card is hot swapped from the bus after the signal switching circuitry of the first processor card has electrically disconnected the first processor card from the bus.

13. The hot swap bus of claim 8 wherein the second processor card can control the power switching circuitry of the first processor card to turn off or turn on the first processor card.

14. The hot swap bus of claim 9 wherein each processor card further comprises PCI circuitry, the PCI circuitry enabling each processor card to interface with a greater number of devices on the PCI bus.

* * * * *